(12) United States Patent
Clapper et al.

(10) Patent No.: US 6,894,683 B2
(45) Date of Patent: May 17, 2005

(54) MULTI-MOUSE ACTIONS STYLUS

(75) Inventors: Edward O. Clapper, Tempe, AZ (US);
David B. Andersen, Hillsboro, OR
(US); Scott W. Watters, Forest Grove,
OR (US)

(73) Assignee: Intel Corporation, Santa Clara, CA
(US)

( * ) Notice: Subject to any disclaimer, the term of this patent is extended or adjusted under 35 U.S.C. 154(b) by 309 days.

(21) Appl. No.: 10/193,082

(22) Filed: Jul. 10, 2002

(65) Prior Publication Data

US 2004/0008189 A1 Jan. 15, 2004

(51) Int. Cl.$^7$ ................................................ G09G 5/00
(52) U.S. Cl. ..................................... 345/179; 178/19.01
(58) Field of Search .............................. 345/173–179; 178/19.01–19.04, 18.01

(56) References Cited

U.S. PATENT DOCUMENTS

| | | | | |
|---|---|---|---|---|
| 5,581,052 A | * | 12/1996 | Padula et al. ............ | 178/19.04 |
| 5,638,093 A | * | 6/1997 | Takahashi et al. .......... | 345/173 |
| 5,969,296 A | * | 10/1999 | Yamamoto et al. ....... | 178/18.01 |
| 6,057,830 A | * | 5/2000 | Chan et al. ................. | 345/157 |
| 6,094,197 A | * | 7/2000 | Buxton et al. .............. | 345/863 |
| 6,408,087 B1 | * | 6/2002 | Kramer ...................... | 382/124 |
| 6,707,451 B1 | * | 3/2004 | Nagaoka ..................... | 345/179 |
| 2002/0057263 A1 | * | 5/2002 | Keely et al. ................ | 345/179 |

FOREIGN PATENT DOCUMENTS

| | | | | | |
|---|---|---|---|---|---|
| JP | 03263116 A | * | 11/1991 | ............. | G06F/3/03 |
| JP | 11212710 A | * | 8/1999 | ............. | G06F/3/03 |
| JP | 2000081951 A | * | 3/2000 | ........... | G06F/3/033 |

* cited by examiner

*Primary Examiner*—Regina Liang
(74) *Attorney, Agent, or Firm*—David N. Tran

(57) ABSTRACT

A stylus includes one or more stylus tips to initiate different mouse actions. The different mouse actions may be initiated by causing the stylus tip to generate disturbance signals on a touch sensitive device. The different mouse actions may also be initiated by using stylus tips of different characteristics with each characteristic associated with a mouse action.

16 Claims, 6 Drawing Sheets

MULTI-MOUSE ACTIONS STYLUS

FIELD OF THE INVENTION

The present invention generally relates to the field of computer systems, and more specifically relating to methods and apparatuses for interacting with the computer systems.

BACKGROUND

Computer systems are becoming increasingly pervasive in our society, including everything from small handheld electronic devices, such as personal data assistants and cellular phones, to application-specific electronic devices, such as set-top boxes, digital cameras, and other consumer electronics, to medium-sized mobile systems such as notebook, sub-notebook, and tablet computers, to desktop systems, workstations, and servers.

As used herein, the term "when" may be used to indicate the temporal nature of an event. For example, the phrase "event 'A' occurs when event 'B' occurs" is to be interpreted to mean that event A may occur before, during, or after the occurrence of event B, but is nonetheless associated with the occurrence of event B. For example, event A occurs when event B occurs if event A occurs in response to the occurrence of event B or in response to a signal indicating that event B has occurred, is occurring, or will occur.

Typically, a user interacts with a computer system using a combination of a keyboard and a mouse. In a two-button mouse, user interface functions include mouse movement, left button down, left button up, right button down and right button up. With each mouse movement, current X-Y coordinates of a corresponding mouse cursor are reported.

A mouse click is defined as a sequence of button down event followed by button up event. Moving the mouse (or an associated cursor) without either button being activated is sometimes referred to as hover. Hover is an important user interface capability for many applications where passing the mouse cursor over an object (e.g., an icon) may cause additional information (hovering information) to be displayed, for example, in a pop up window.

When using computer systems such as web tablets, personal digital assistants (PDA's), etc., users rely on a touch screen and a stylus instead of a mouse to interact with the devices. This is because the mobile usage requirements and device form factors (e.g., small display screen, etc.) of these computer systems do not conveniently allow for the use of the mouse.

Since the stylus typically has only a single event capability when it makes contact with the screen, the stylus is dedicated to performing key actions such as selection of a link, execution of a control, etc. When the stylus comes into contact with the touch screen, the contact is interpreted as a left button down at the corresponding touch screen coordinates. Lifting the stylus generates a left button up event. Thus, as defined above, the combination of stylus down followed by stylus up is interpreted as a left click.

In many instances, however, the stylus is used to interface with applications originally designed for use with a mouse. As such, using a stylus that only signals left click events limits functionalities of these applications. In this sense, the mouse offers advantages over the stylus. For example, the mouse cursor can be moved without committing to an action and still is able to provide the user information through the hover capability.

The ability for a stylus to achieve all of the functions of a mouse (e.g., both left and right button up and down events, etc.) has been a subject of many research efforts. There are sophisticated and significantly expensive touch screen systems available on the market today using styluses that include electronics or styluses that generate electrical signals. Such systems are often expensive to implement.

BRIEF DESCRIPTION OF THE DRAWINGS

The following drawings disclose various embodiments of the present invention for purposes of illustration only and are not intended to limit the scope of the invention.

DETAILED DESCRIPTION

Methods and an apparatuses for providing mouse actions using styluses are disclosed. For one embodiment, different effects of stylus tips on a touch sensitive device are used to identify different mouse actions.

In the following descriptions, the term deformation or surface deformation is used to generally describe one or more of the physical and mechanical effects that occurs when a surface of a touch sensitive device is touched. The term surface response is the response of the touch sensitive device and is used to generally describe operations performed by the touch sensitive device in response to the surface deformation.

Figure 1A:
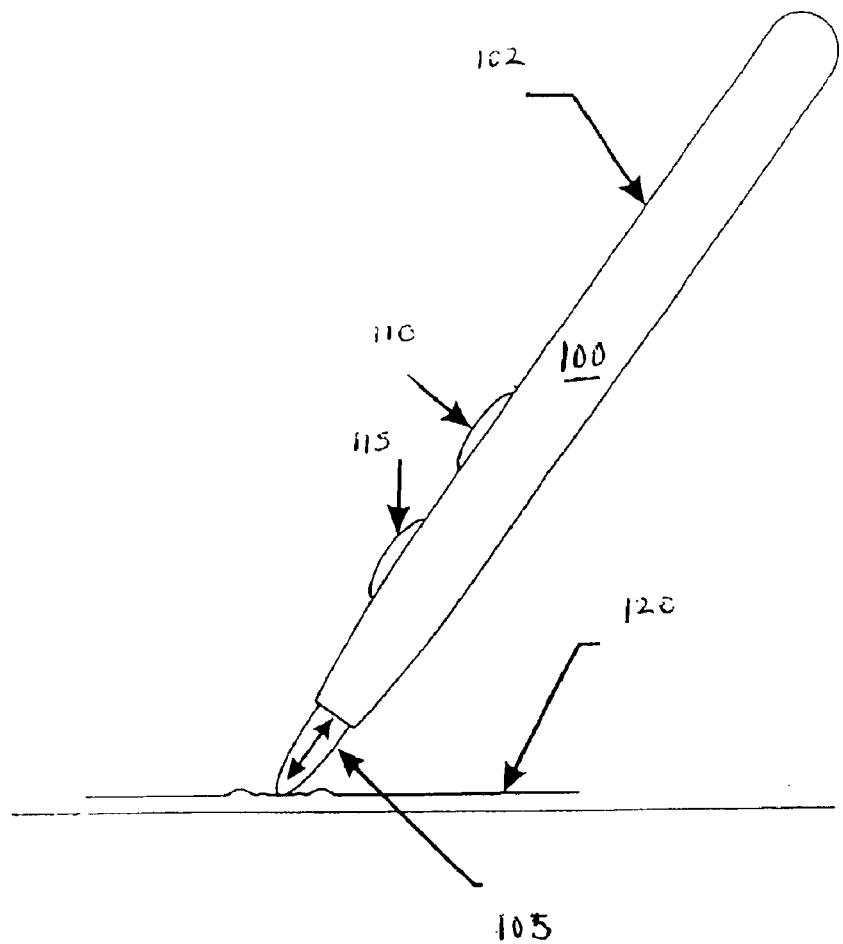
FIG. 1A is a diagram illustrating a stylus in accordance with one embodiment of the present invention.

FIG. 1A is a diagram illustrating a stylus in accordance with one embodiment of the present invention. The stylus 100 includes a housing 102 and a stylus tip 105. The stylus 100 may include mechanisms to control movements of the stylus tip 105. The stylus tip 105 may be coupled to an elastic mechanism (e.g., a spring) to help with its movement. For example, the stylus 100 includes two buttons 110 and 115 to control movements of the stylus tip 105 along the longitudinal direction of the housing 102. The two buttons 110 and 115 may be used to implement functions similar to those functions implemented as a result of pressing the left and right button of the mouse. For example, pressing the button 110 may cause one or more movements in the stylus tip 105 to initiate an action similar to pressing the left button of the mouse. Pressing the button 115 may cause one or more movements in the stylus tip 105 to initiate an action similar to pressing the right button of the mouse, etc. The stylus 100 may be used to interact with a computer system (not shown) having a touch sensitive device 120 that is capable of responding to different characteristics of the stylus tip 105.

The characteristics of the stylus tip 105 may include, for example, one or more of oscillation, geometry, material, etc. The touch sensitive device 120 may be a touch screen and may include logic to perform various operations, including identifying different types of contacts with the stylus tip 105, for example. For one embodiment, the stylus 100 may be a mechanical stylus. For example, the stylus 100 may not include any electronics or any components capable of causing the stylus tip 105 to generate electrical signals necessary for identification of the different mouse actions.

For one embodiment, the touch sensitive device 120 may be capable of responding to different types of disturbance signal(s) 128 caused by the oscillations of the stylus tip 105. For example, pressing the button 110 once may cause the stylus tip 105 to oscillate and generate a first type of disturbance signal(s) on the touch sensitive device 120. The first type of disturbance signal(s) may be interpreted as pressing the left button of the mouse. For example, pressing the button 115 once may cause the stylus tip 105 to oscillate and generate a second type of disturbance signal(s) on the touch sensitive device 120. The second type of disturbance signal(s) may be interpreted as pressing the right button of the mouse. For example, when the stylus tip 105 generates two consecutive disturbance signal(s) of the first type, the touch sensitive device 120 may interpret that as twice pressing the left button of the mouse (or double click). Other combinations of disturbance signals may also be interpreted by the touch sensitive device 120 as different mouse actions.

Figure 1B:
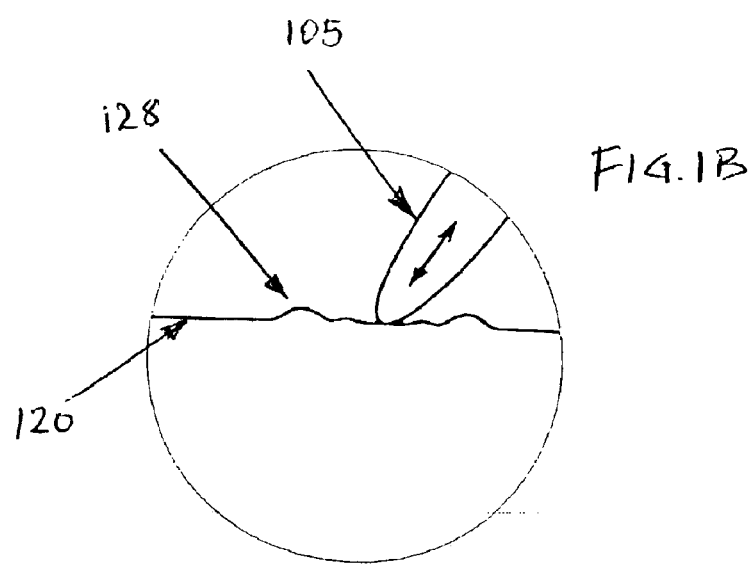
FIG. 1B illustrates an example of disturbance caused by the oscillations of a stylus tip.

FIG. 1B illustrates an example of disturbance signals generated by the oscillations of the stylus tip 105. For one embodiment, the interpretation of the different disturbance signals by the touch sensitive device 120 may be performed by a comparator (not shown) or a look up mechanism (not shown). For example, the comparator may compare the disturbance signals with a set of known disturbance signals to identify the appropriate mouse action.

For one embodiment, when a user places the stylus tip 105 in contact with the touch sensitive device 120 and neither of the buttons 110 and 115 is pressed, the contact point may be interpreted by the touch sensitive device 120 as the current coordinates of the stylus tip 105, similar to the coordinates of the mouse cursor when using the mouse. The contact point of the stylus tip 105 with the touch sensitive device 120 may be changed when the user lifts the stylus tip 105 and places it in contact with the touch sensitive device 120 at another location on the touch sensitive device 120. Alternatively, the contact point may be changed when the user drags the stylus tip 105 from its current location on the touch sensitive device 120 to another location on the touch sensitive device 120 while keeping the stylus tip 105 in constant contact with the touch sensitive device 120. For another embodiment, when the stylus tip 105 is not in contact with the touch sensitive device 120, the last contact point may be remembered as the current contact point or the current location of the cursor. The touch sensitive device 120 may be able to interpret events associated with the stylus tip 105 being dragged, lifted, etc.

The oscillations of the stylus tip 105 may result in one or more surface contacts with the touch sensitive device 120. For one embodiment, a time interval between a first surface contact and a last surface contact may be referred to as an oscillation interval. For example, when pressing the button 110, the stylus tip 105 may oscillate and come into contact with the touch sensitive device 120 for a first oscillation interval. When pressing the button 115, the stylus tip 105 may oscillate and come into contact with the touch sensitive device 120 for a second oscillation interval, etc. Each oscillation interval may correspond to a different mouse action. The oscillation interval may be measured from a first time the stylus tip 105 has an effect on the touch sensitive device 120 to a last time the stylus tip 105 has an effect on the touch sensitive device 120, for example. Alternatively, the oscillation interval may be measured from a first time the stylus tip 105 causes a most deformation on the touch sensitive device 120 to a second time the stylus tip 105 causes a second most deformation on the touch sensitive device 120. Other measuring sticks may also be used to determine the oscillation intervals for identifications of different associated mouse actions.

Figure 2:
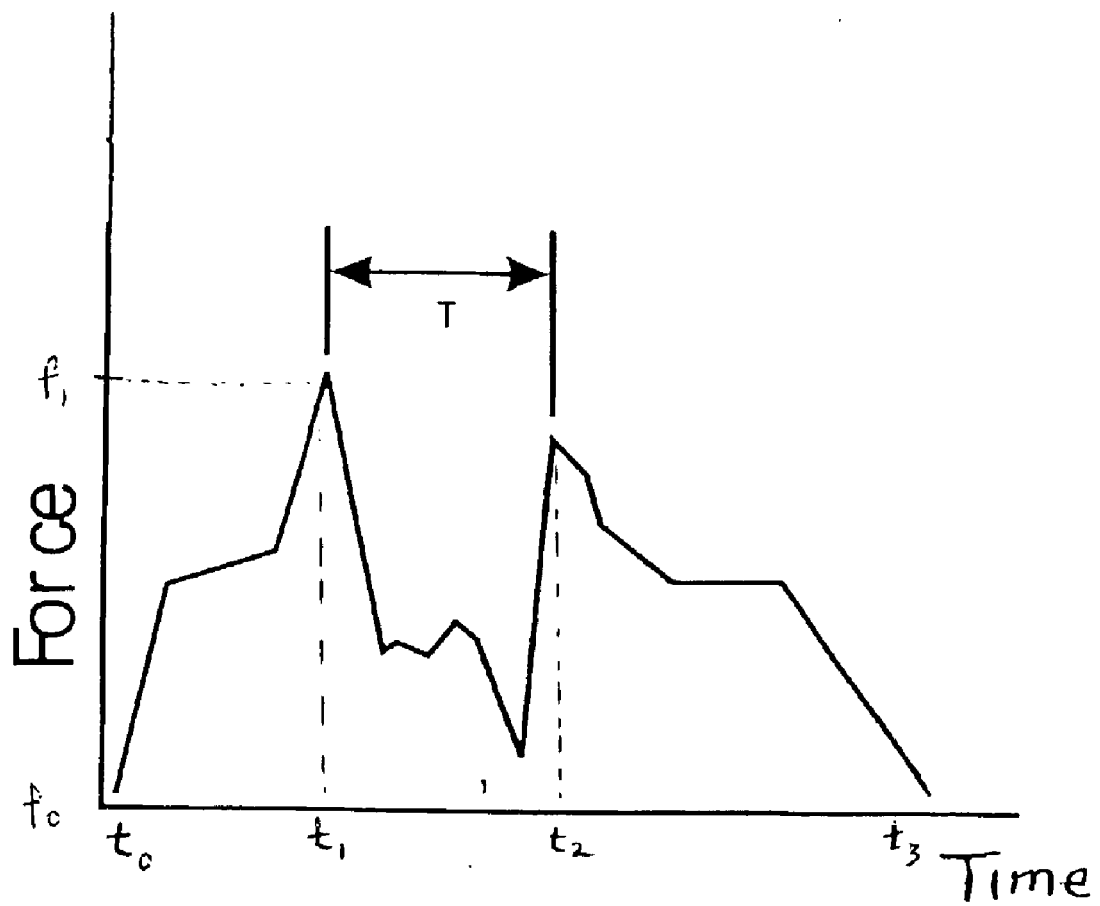
FIG. 2 is a graph example illustrating an oscillation interval.

FIG. 2 is a graph example illustrating an oscillation interval. The increasing force illustrated between times t0 and t1 may reflect a pressing of one of the buttons 110 or 115 causing the stylus tip 105 to be in further contact with the touch sensitive device 120. At the time t1, the force is at its highest point and the most deformation is caused on the touch sensitive device 120 by the stylus tip 105. At the time t2, the force is at its second highest point and the second most deformation is caused on the touch sensitive device 120. Between the time t1 and t2, the stylus tip 105 may oscillate and its deformation effect on the touch sensitive device 120 may vary, as illustrated by the varying of the force, even though the user may perceive that the stylus tip 105 remains in contact with the touch sensitive device 120. The time interval between the time t1 and t2 may be referred to as the oscillation interval, as described above. The oscillation interval may be used to distinguish one mouse action from another mouse action. For one embodiment, the oscillation interval may be used to distinguish an actual event caused by the stylus tip as compared to an accidental event caused by, for example, a non-stylus object. The behavior of the graph (or the force variation) between the time t1 and the time t2 (or the oscillation interval) may be referred to as a profile or a signature associated with, for example, pressing the button 110. Similarly, there may be a different signature associated with pressing the button 115. Each signature may be unique and is associated with a unique sequence of effects on the touch sensitive device 120. There may be multiple unique signatures for multiple different mouse actions. These unique signatures may be predetermined and stored for subsequent comparisons. For example, when a signature is determined, it is compared with the stored signatures, and when there is substantial resemblance, an associated mouse action is identified.

The oscillation of the stylus tip 105 may be caused by the elastic mechanism (e.g., a spring element) (not shown) that the stylus tip 105 is coupled to. The elastic mechanism may be hidden inside the stylus housing 102. The decrease in the force between the time t2 and t3 may indicate the lesser deformation caused by the stylus tip 105 on the touch sensitive device 120. For one embodiment, when the stylus tip 105 is in light contact with the touch sensitive device 120, the stylus tip 105 may cause minor deformation on the touch sensitive device 120. For example, since the force on the touch sensitive device 120 at the time t0 or t3 is at a low level, the touch sensitive device may interpret that there is a slight contact with the stylus tip 105.

The touch sensitive device 120 may be implemented with circuitry to respond to a surface effect. The surface effect may be caused by the contact of the stylus 100 or any stylus devices. The surface effect may, for example, be a region on the touch sensitive device 120 that is deformed or compressed as a result of the contact. The touch screen 120 may then be able to interpret the surface effect and translate that into an appropriate mouse action. For example, the interpretation may be performed based on a number of touch sensitive cells of the touch sensitive device 120 that are affected by the deformation.

Figure 3:
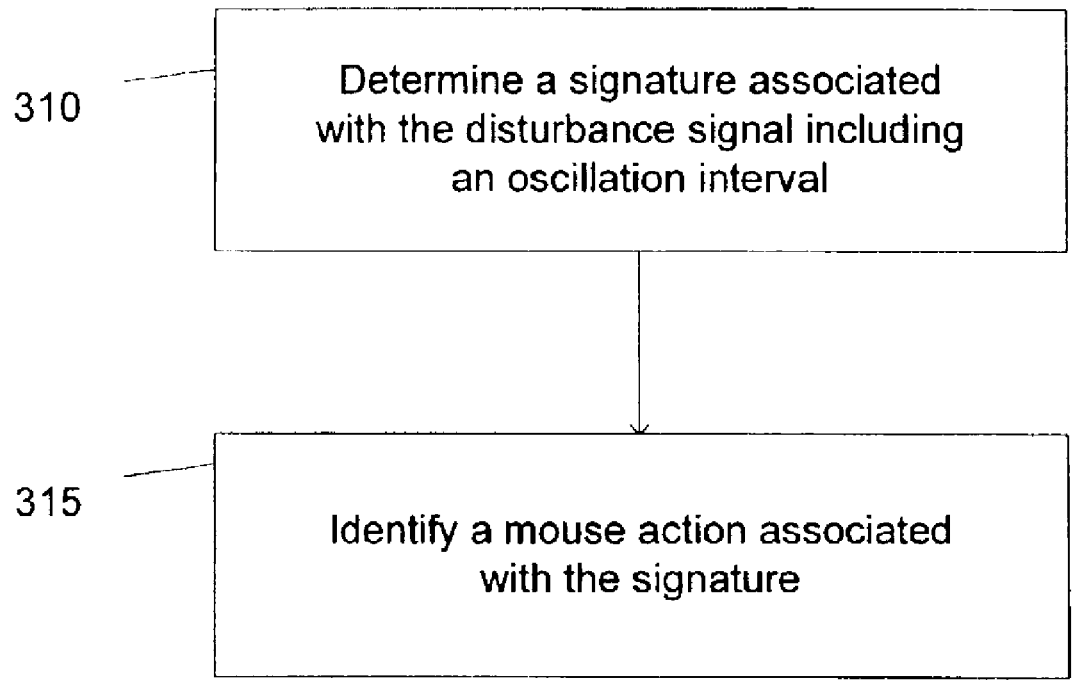
FIG. 3 is a flow diagram illustrating an example of a process that interprets disturbance signals to identify mouse actions in accordance with one embodiment of the present invention.

FIG. 3 is a flow diagram illustrating an example of a process that interprets disturbance signals to identify mouse actions in accordance with one embodiment of the present invention. The process may be performed to identify different types of mouse action initiated by a user using the stylus 100. At block 305, a signature associated with the disturbance signals is determined. This determination may include measuring the oscillation interval associated with the disturbance signals.

At block 310, the signature determined in block 310 may be compared with predetermined signatures. There may be different unique signatures for different disturbance signals. Based on the signature determined in block 310, the appropriate mouse action is identified.

The process described in FIG. 3 may operate continuously to identify multiple mouse actions. Furthermore, although the stylus 100 is described as having two buttons 110 and 115, other implementations of the stylus using one button or more than two buttons may also be used such that pressing the different buttons may generate different disturbance signals on the touch the touch sensitive device 120. For example, it may be possible to use one button where sliding the button downward causes the stylus tip 105 to generate one set of disturbance signals and sliding the button upward causes the stylus tip 105 to generate another set of disturbance signals.

Typically, when the stylus tip 105 is in contact with the touch the touch sensitive device 120, the two-dimensional coordinates of the contact point (e.g., X-Y coordinates) is calculated to determine location of an associated cursor. The touch sensitive device 120 may also calculate a third coordinate (Z-coordinate) of the contact point by sensing pressure exerted at the contact point. For example, the touch sensitive device 120 may be capable of sensing and ignoring a pressure that is less than a predetermined threshold pressure as a non-event. Similarly, the touch sensitive device 120 may be capable of sensing a pressure that is higher than the predetermined threshold pressure as a real event that needs to be processed accordingly. Touch screen logic (e.g., software driver) may be used to sense the different pressures at the contact points.

For one embodiment, the surface response of the touch sensitive device 120 at the contact point may vary depending on the characteristics of the stylus tip 105. The surface response of the touch sensitive device 120 may be proportional to the geometry (e.g., size) of the stylus tip 105. This proportionality may exist when the pressure exerted on the stylus 100 against the touch sensitive device 120 may remain substantially similar. For example, the user may initiate a first mouse action when using a stylus tip having a first size, a second mouse action when using a stylus tip having a second size, etc. The surface response of the touch sensitive device 120 may also vary depending on the material characteristic of the stylus tip 105. For example, the surface response may be higher when the material is of one type, and it may be lower when the material is of another type. In other words, the surface response of the touch sensitive device 120 may vary depending on one or more of the geometry characteristics and the material characteristics of the stylus tip 105. The variations of the surface response may be used to distinguish the different mouse actions. For example, when the surface response is within a first range, pressing of the left mouse button is interpreted. When the surface response is within a second range, pressing of the right mouse button is interpreted, etc.

For one embodiment, the material characteristics of the stylus tip 105 may be of the category such that low friction is exhibited when the stylus tip 105 is in contact with the touch sensitive device 120. This facilitates action such as, for example, hover mode and drag-drop operations. For another embodiment, the material characteristics of the stylus tip 105 may include deformable characteristics. Deformable characteristics may enhance the effect of the contact area differential and therefore may be more reliable at various angles and forces. It may be desirable that the material used for the stylus tip 105 does not leave a residual or mark on the touch sensitive device 120. For example, the material may have a high durometer value to improve reliability for the stylus application. Examples of materials that may be used include high-durometer foam rubber, neoprene, Styrofoam, compressed paper, fabric-coated elastomers, etc.

Figure 4A:
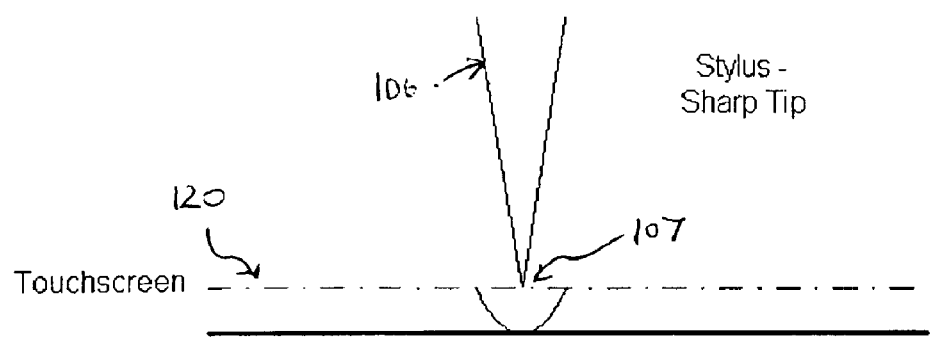
FIG. 4A is a diagram illustrating an example of pressure generated on a touch sensitive device by a sharp stylus tip.
Figure 4B:
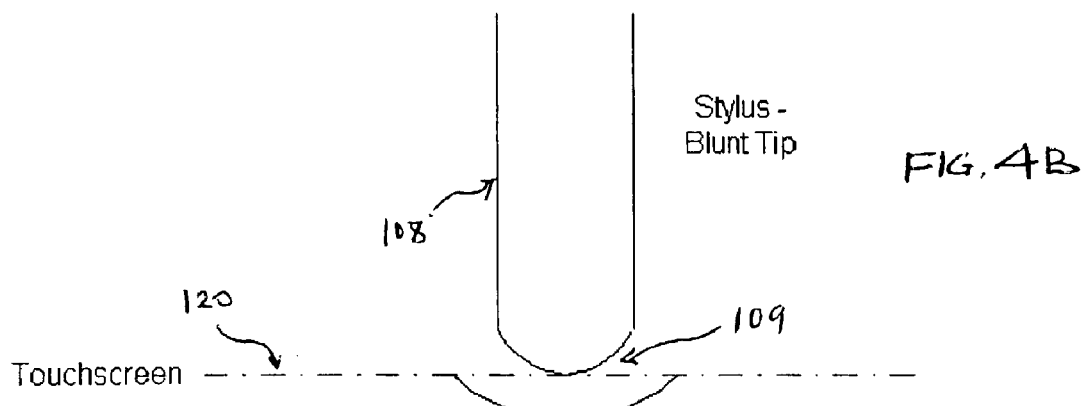
FIG. 4B is a diagram illustrating an example of pressure generated on a touch sensitive device by a blunt stylus tip.

FIG. 4A is a diagram illustrating an example of pressure generated on a touch sensitive device 120 by a sharp stylus tip 106. As illustrated, when the sharp stylus tip 106 is in contact with the touch sensitive device 120, the surface contact area 107 is small. As a result, the surface response (or pressure reading) of the touch sensitive device 120 is low. FIG. 4B is a diagram illustrating another example of pressure generated on the touch sensitive device 120 by a blunt stylus tip 108. As illustrated, when the blunt stylus tip 107 is in contact with the touch sensitive device 120, the surface contact area 109 is larger, as compared to the surface contact area 107. As a result, the surface response of the touch sensitive device 120 is higher. In other words, a narrowed-tipped stylus generates a lower surface response reading than a wide-tipped stylus.

For one embodiment, when the touch screen logic (e.g., touch screen software driver) identifies an event as a real event, the touch screen logic may further distinguish the real event as one of different associated mouse actions. For example, the touch screen logic may use a comparator to compare the surface response with predetermined ranges of surface responses to identify the appropriate mouse actions. There may be multiple predetermined ranges of surface responses, each associated with a different mouse action.

For one embodiment, different sizes of surface contact area may be used to identify different mouse actions. For example, a large stylus tip has a larger surface contact area than a thin stylus tip. The large stylus tip may be used to initiate an action associated with pressing the left mouse button. The thin stylus tip may be used to initiate an action associated with pressing the right mouse button. Other sizes of surface contact area may also be used for different mouse actions.

Using the surface response or the surface contact area technique may allow for using low cost styluses to initiate different mouse actions. For example, a stylus having two stylus tips of different geometry characteristics with one stylus tip at each end may be used to generate an event associated with pressing the left mouse button and an event associated with pressing the right mouse button, respectively.

Figure 5:
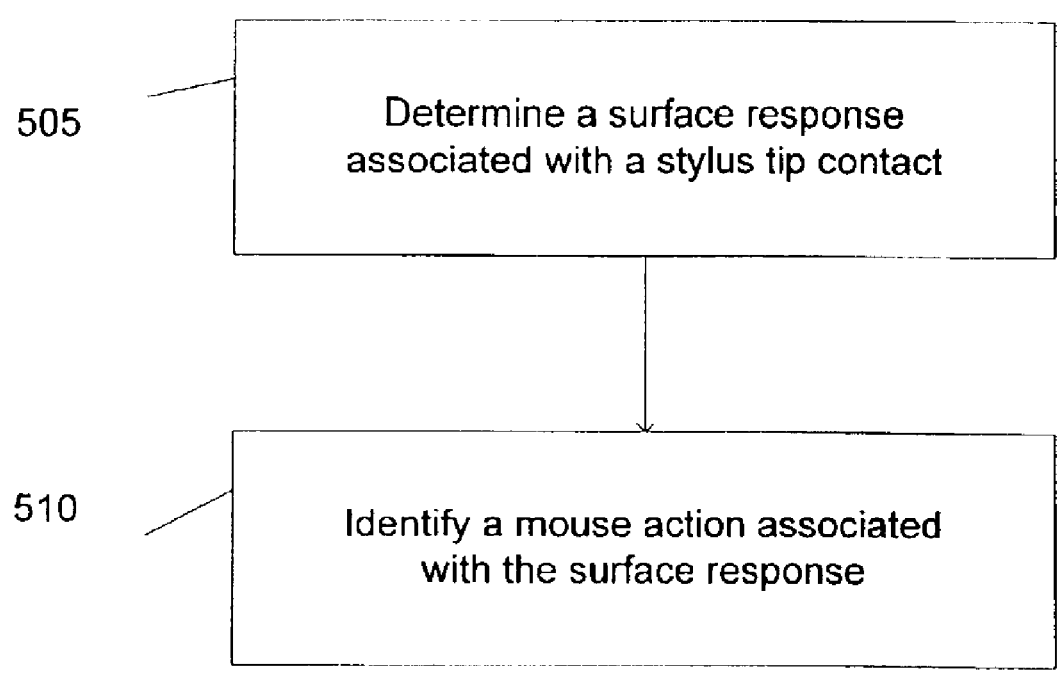
FIG. 5 is a flow diagram illustrating an example of a process using surface response to identify mouse actions in accordance with one embodiment of the present invention.

FIG. 5 is a flow diagram illustrating an example of a process using surface response to identify mouse actions in accordance with one embodiment of the present invention. This process corresponds to the examples illustrated in FIG. 4A and FIG. 4B where the pressure readings are determined based on the sharpness or bluntness of the stylus tip. When a contact occurs between the stylus tip and the touch sensitive device 120, a surface response associated with the contact is determined by the touch sensitive device 120, as shown in block 505. As described above, the sharper the stylus tip, the lesser the amount of surface response. Alternatively, the more blunt the stylus tip, the higher the amount of pressure sensed. At block 510, based on the surface response determined in block 505, an appropriate mouse action is identified. This may involve, for example, using comparator logic or a look up mechanism to map the surface response with predetermined ranges of surface responses that are associated with different mouse actions.

For one embodiment, the sensing logic may be implemented to recognize fast movements of the stylus tip from one location on the touch sensitive device 120 to another location on the touch sensitive device 120 within at least one of certain distance parameters (or distance intervals) and time parameters (or time intervals). For example, if the stylus tip is moved more than X pixels within Y milliseconds, the action may be interpreted as initiating a hovering mode. If the stylus tip is in contact with the touch sensitive device 120 at one location for more than Z milliseconds and then is moved to another location, the action may be interpreted as initiating a drag operation.

For one embodiment, the touch sensitive device 120 may include a transducer (not shown) to sense or be able to respond to different characteristics of the stylus tip 105. As described above, these characteristics may include, for example, oscillation, geometry, mechanical, etc. The transducer may be part of the touch sensitive device 120. The transducer may perform the sensing logic function to, for example, convert the disturbance signals to associated electrical signals for identification of the different associated mouse actions. The transducer may also perform the sensing logic function to, for example, translate the surface response of the touch sensitive device 120 to associated electrical signals for identification of the different associated mouse actions. For one embodiment, the touch sensitive device 120 may include logic (e.g., software, hardware, or both) that enables the touch sensitive device 120 to have the same level of sensitivity at different surface locations, thus overcoming the spatial variance in touch sensitivity that typically exists for these types of devices. This may allow the same contact with the stylus tip to be identified as the same mouse action regardless of the surface locations.

Figure 6:
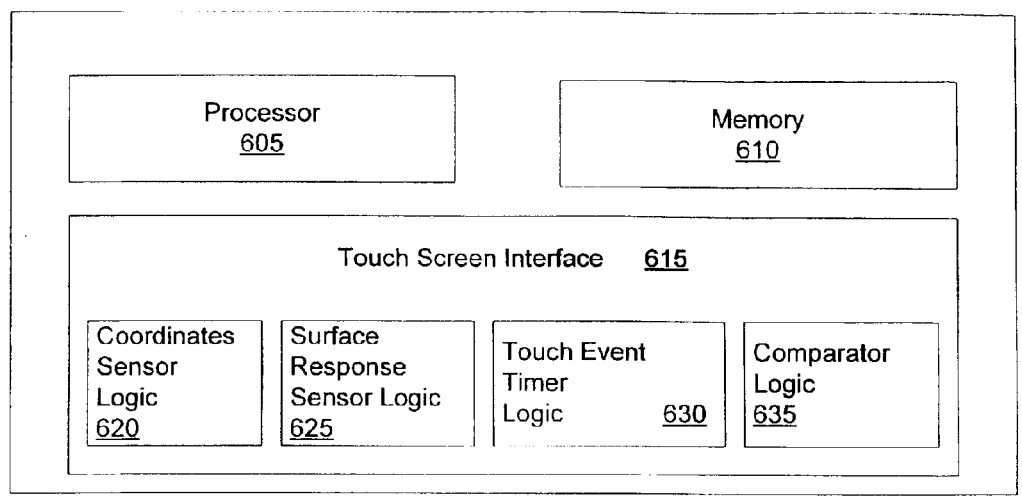
FIG. 6 is a block diagram illustrating an example of a computer system that may be used in accordance with one embodiment of the invention.

FIG. 6 is a block diagram illustrating an example of a computer system that may be used in accordance with one embodiment of the invention. The computer system may include a processor 605 and a memory 610. The memory 610 may be random access memory (RAM), read only memory (ROM), a persistent storage memory, such as mass storage device or any combination of these devices. The computer system also includes a touch screen interface 615. The touch screen interface 615 may include coordinate sensor logic 620 to determine coordinates of the contact points. The touch screen interface 615 may also include screen sensor logic 625 to determine different types of surface responses and to identify appropriate mouse actions. Furthermore, the touch screen interface 615 may also include touch event timer logic 630 to determine, for example, oscillation intervals.

The processor 605 may execute sequences of computer program instructions that may be stored in a memory 610 which may be considered to be a machine-readable storage media. Execution of the sequences of instructions may cause the processor 605 to perform operations according to the processes described above, for example. The instructions may be loaded into the memory 610 from a storage device or from one or more other computer systems (e.g., a server computer system) over a network connection.

Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method, comprising:

causing a stylus tip of a mechanical stylus to make one or more contacts with a touch sensitive surface, the one or more contacts resulting from the stylus tip oscillating relative to a stylus housing;

determining a signature associated with disturbance signals generated by the stylus tip; and based on the signature, identifying an associated mouse action.

2. The method of claim 1, further comprising:

comparing the determined signature with one or more predetermined signatures, each of the one or more predetermined signatures associating with a mouse action.

3. The method of claim 2, wherein if the determined signature resembles a first predetermined signature, an action associated with pressing a left mouse button is performed.

4. The method of claim 2, wherein if the determined signature resembles a second predetermined signature, an action associated with pressing a right mouse button is performed.

5. The method of claim 2, wherein if the determined signature resembles a third predetermined signature, an action associated with hovering is performed.

6. The method of claim 1, wherein determining the signature associated with the disturbance signals generated by the stylus tip comprises:

determining coordinates of a location on a touch sensitive device, the location associated with an originating point of the disturbance signal.

7. The method of claim 6, further comprises:

determining an oscillation interval associated with the disturbance signals caused by the mechanical stylus at the location.

8. The method of claim 7, wherein the oscillation interval occurs between a time the touch sensitive device has a first deformation and a time the touch sensitive device has a second deformation.

9. A device, comprising:

a stylus tip; and a first mechanical control mechanism coupled to the stylus tip, the first mechanical control mechanism to cause the stylus tip to oscillate on a surface of a touch sensitive device for a first oscillation interval, wherein the first oscillation interval is associated with a first mouse action.

10. The device of claim 9, wherein the first oscillation interval is associated with a first signature, the first signature including a unique sequence of effects caused by the stylus tip on the touch sensitive device during the first oscillation interval.

11. The device of claim 10, wherein the unique sequence of effects includes a unique sequence of pressures caused by the stylus tip on the touch sensitive device.

12. The device of claim 9, further comprising a second mechanical control mechanism coupled to the stylus tip, the second mechanical control mechanism to cause the stylus tip to oscillate on the surface of the touch sensitive device for a second oscillation interval, wherein the second oscillation interval is associated with a second mouse action.

13. A stylus, comprising:
   a housing;
   a stylus tip coupled to the housing and affixed to a flexing element; and
   one or more mechanical mechanisms coupled to the housing and to the flexing element, the one or more mechanical mechanisms to direct oscillations of the stylus tip using the flexing element, wherein the oscillations of the stylus tip generate different disturbance signals on a touch sensitive device, the different disturbance signals associated with different mouse actions.

14. The stylus of claim 13, wherein the flexing element is a spring.

15. The stylus of claim 13, wherein the one or more mechanical mechanisms includes a first mechanical mechanism to direct oscillations of the stylus tip to generate a first signature, the first signature associated with pressing of a left mouse button.

16. The stylus of claim 13, wherein the one or more mechanisms includes a second mechanical mechanism to direct oscillations of the stylus tip to generate a second signature, the second signature associated with pressing of a right mouse button.

* * * * *